(12) United States Patent
Sobrino et al.

(10) Patent No.: US 12,429,148 B2
(45) Date of Patent: Sep. 30, 2025

(54) VALVE SYSTEM WITH IMPROVED SEALING

(71) Applicant: ASCO SAS, Luce (FR)

(72) Inventors: Cécilio Sobrino, Montlouis sur Loire (FR); Vivek Pandurang Fale, Pune (IN); Jean-Pierre Gomez, Amilly (FR); Arnaud Peltier, Yevres (FR)

(73) Assignee: ASCO SAS, Luce (FR)

( * ) Notice: Subject to any disclaimer, the term of this patent is extended or adjusted under 35 U.S.C. 154(b) by 76 days.

(21) Appl. No.: 18/036,656

(22) PCT Filed: Oct. 27, 2021

(86) PCT No.: PCT/EP2021/079815
§ 371 (c)(1),
(2) Date: May 12, 2023

(87) PCT Pub. No.: WO2022/101012
PCT Pub. Date: May 19, 2022

(65) Prior Publication Data
US 2024/0011580 A1    Jan. 11, 2024

(30) Foreign Application Priority Data

Nov. 13, 2020   (IN) .............................. 202021049687

(51) Int. Cl.
*F16K 41/04*    (2006.01)
*F16K 41/00*    (2006.01)
*F16K 41/02*    (2006.01)

(52) U.S. Cl.
CPC .............. *F16K 41/04* (2013.01); *F16K 41/00* (2013.01); *F16K 41/02* (2013.01)

(58) Field of Classification Search
CPC ........... F16K 41/02; F16K 41/00; F16K 41/04
See application file for complete search history.

(56) References Cited

U.S. PATENT DOCUMENTS

| | | | | |
|---|---|---|---|---|
| 1,867,279 A | * | 7/1932 | Price | F16K 41/04 |
| | | | | 277/510 |
| 4,601,457 A | * | 7/1986 | Austin | F16K 31/1221 |
| | | | | 251/63 |
| 2017/0089473 A1 | * | 3/2017 | Nowell | F16K 5/0471 |

FOREIGN PATENT DOCUMENTS

| | | | |
|---|---|---|---|
| CN | 202 812 441 | | 3/2013 |
| CN | 206361249 U | * | 7/2017 |
| DE | 38 27 930 | | 2/1990 |
| DE | 4042035 | | 7/1991 |
| GB | 1 039 129 | | 8/1966 |

OTHER PUBLICATIONS

International Search Report dated Jan. 28, 2022.

* cited by examiner

*Primary Examiner* — Atif H Chaudry
(74) *Attorney, Agent, or Firm* — IPSILON USA, LLP

(57) ABSTRACT

A valve system (1) comprising a valve body (20) and a stuffing box (30) assembled to the valve body (20), the valve body (20) having an internal surface (29) defining an annular groove (21), the annular groove (21) comprising an upper side (22), a lower side (23) and a bottom (24) extending axially between the upper (23) and lower (23) sides, the annular groove (21) forming with the stuffing box (30) an annular cavity (80) for receiving a sealing element (15).

10 Claims, 5 Drawing Sheets

VALVE SYSTEM WITH IMPROVED SEALING

RELATED APPLICATION

This application is a National Phase of PCT/EP2021/079815 filed on Oct. 27, 2021, which claims the benefit of priority from Indian Patent Application No. 2020 21049687, filed on Nov. 13, 2020, the entirety of which are incorporated by reference.

FIELD OF INVENTION

The present invention is related to a valve system, and more particularly but not exclusively to a pressure actuated fluid valve system.

BACKGROUND

A type of commonly used valve system, as shown in FIGS. 1A, comprises a valve body 20 housing a plunger 40 fixed at one end to a reciprocating valve stem 50. The latter extends at the other end into a top box (not shown) of the valve system. The top box may comprise actuating means for controlling the reciprocating movement of the stem 50.

The valve system further comprises a stuffing box 30 fixed to the valve body 20 and housing an annular packing 60 for sealing the stem 50.

In currently known systems, the stuffing box 30, after being threaded to the valve body 20, forms a visible protrusion P on the outside surface of the valve body 20, where dirt and alike may accumulate, which is not desirable in view of the general requirements of some industries such as the food and hygiene industries.

Furthermore, in known products, a sealing element 15 for preventing liquid leakage between the stuffing box and valve body, commonly made of polytetrafluoroethylene (PTFE), is received in an annular cavity 80 formed between the stuffing box and the valve body as shown in FIG. 1B.

In such a construction, the sealing element 15 is compressed essentially in the axial direction by the stuffing box 30. This construction requires a relatively high screwing torque for compressing the sealing element 15 due to the large contact area between the latter and the stuffing box 30. Furthermore, since the sealing element 15 is little compressed or not compressed in the radial direction, the fluid 87 is not prevented to enter the space between the sealing element 15 and the stuffing box 30 on the radially inner side of the sealing element, as shown. Therefore, the pressure of the fluid 87 may cause in some situations the sealing element 15 to flow into an axial gap 84 between the valve body 20 and the stuffing box 30. This may lead to a possibility of leakage over a time due to stress relief of the sealing element 15 caused by this deformation of the sealing element. The seal relaxation may also result in thread loosening between the stuffing box 30 and the valve body 20.

DE4042035 discloses a sealing arrangement on a spindle of a valve. The arrangement comprises a stuffing box arranged between a collar threaded thereto and a flange of a valve body. The stuffing box comprises recesses forming respectively with the flange and the collar a cavity for receiving a sealing element. In DE 4042035, the cavities also require relatively high screwing torque for compressing the sealing elements due to the large contact area between the latter and the stuffing box.

There exists a need to further improve existing valve systems and to remedy at least in part to the drawbacks mentioned above.

SUMMARY OF THE INVENTION

Exemplary embodiments of the present invention relate to a valve system comprising a valve body and a stuffing box assembled to the valve body, the valve body having an internal surface defining an annular groove, this annular groove having an upper side, a lower side and a bottom extending axially between the upper and lower sides, the annular groove forming with the stuffing box an annular cavity for receiving a sealing element.

The terms "upper" and "lower" refer to the relative position along a longitudinal axis of the system oriented vertically, with the stuffing box lying above the valve body.

In the present invention, the sealing element is at least partially received in the groove. Accordingly, the part of the sealing element received in the groove is not axially compressed by the stuffing box. Thus, due to the reduced contact area between the stuffing box and the sealing element, the assembly needs lower screwing torque for sealing. In this way, the sealing element may be more easily caused to expend radially against the stuffing box and the valve body and create corresponding sealing surfaces. A flow of fluid at the interface between the sealing element and the stuffing box and over the entire height of the sealing element may be more easily avoided.

The groove may have a depth of at least 1 mm.

A shoulder of the internal surface of the valve body defining the lower side of the groove may come in axial abutment with the stuffing box.

The stuffing box preferably comprises a first and a second shoulder.

The first shoulder may be configured for coming in axial contact with the sealing element.

The second shoulder may be in axial abutment with the shoulder of the valve body defining the lower side of the groove.

The stuffing box may comprise a surface, preferably cylindrical, extending axially between the first and second shoulders, configured for coming in radial contact with the sealing element.

Preferably, the valve system comprises a plunger housed in the valve body; this plunger may be fixed at one end to a reciprocating valve stem.

The valve may comprise a first interface extending axially between the valve body and the stuffing box, situated axially farther from the plunger than the annular groove. The first interface may be located at a distance from the longitudinal axis of the system, that is smaller than the distance from which the bottom of the groove is spaced from said axis, but preferably larger than the distance by which the surface extending axially between the first and second shoulders is spaced from said axis.

The valve may comprise a second interface extending axially between the valve body and the stuffing box, situated axially closer to the plunger than the annular groove. The second interface may be located at a distance from the longitudinal axis of the system that is smaller than the distance by which the surface extending axially between the first and second shoulders is spaced from said axis.

The stuffing box is preferably assembled to the valve body by screwing and the valve system comprises corresponding threads on the stuffing box and the valve body. The annular cavity is preferably located closer to the plunger than said threads, when observed along a longitudinal axis of the valve system. The sealing element thus avoids the fluid to flow into the threads.

The sealing element may comprise or be composed of PTFE.

The valve system may be a pressure actuated valve system, or motor actuated valve.

Exemplary embodiments of the present invention also relate to a method for assembling a valve body and a stuffing box of a valve system, the stuffing box comprising a collar in contact with a top surface of the valve body, the method comprising deforming the stuffing box during assembly thereof to the valve body, preferably by screwing, so that the height by which the collar protrudes is decreased after assembly.

By deforming said collar during assembly, the invention allows forming a smoother surface at the joint line between the stuffing box and the valve body, without leaving any substantial retention area at the joint line.

In particular, the valve system thus obtained may not comprise any acute or right angle between the top surface of the valve body and a top surface of the collar.

Exemplary embodiments of the present invention also relate to a method for assembling a valve body and a stuffing box of a valve system, the valve body being assembled to the stuffing box by screwing, the valve body having an internal surface defining an annular groove, this annular groove having an upper side, a lower side and a bottom extending axially between the upper and lower sides, the annular groove forming with the stuffing box an annular cavity for receiving a sealing element, the stuffing box comprising a collar in contact with a top surface of the valve body, the method comprising deforming the stuffing box during assembly thereof to the valve body, so that the height by which the collar protrudes is decreased after assembly.

The valve system obtained after assembly may exhibit all or part of the features of the valve system mentioned above.

The method may comprise a first step of positioning the collar of the stuffing box on the top surface of the valve body, while keeping an axial gap between the lower side of the annular groove and the stuffing box, in particular between the lower side of the annular groove and the second shoulder thereof.

The method may comprise a second step of mechanically deforming the collar of the stuffing box, in particular due to screwing during the assembly, until the lower side of the annular groove comes into contact with the stuffing box, in particular until the shoulder of the valve body defining the lower side of the annular groove comes into contact with the second shoulder.

Exemplary embodiments of the present invention also relate to a valve system, comprising a valve body and a stuffing box assembled to the valve body by screwing, the stuffing box comprising a collar in contact with a top surface of the valve body, the collar of the stuffing box being deformed during assembly thereof to the valve body.

Embodiments of the invention will now be described in some further detail with reference to and as illustrated in the accompanying figures. These embodiments are illustrative only, and are not meant to be restrictive of the scope of the invention.

BRIEF DESCRIPTIONS OF THE FIGURES

FIG. 1A, already described, is a schematic longitudinal cross section of a known valve system;

FIG. 1B, already described, is an enlarged view of an open-groove sealing structure;

DETAILED DESCRIPTIONS

Figure 1A:
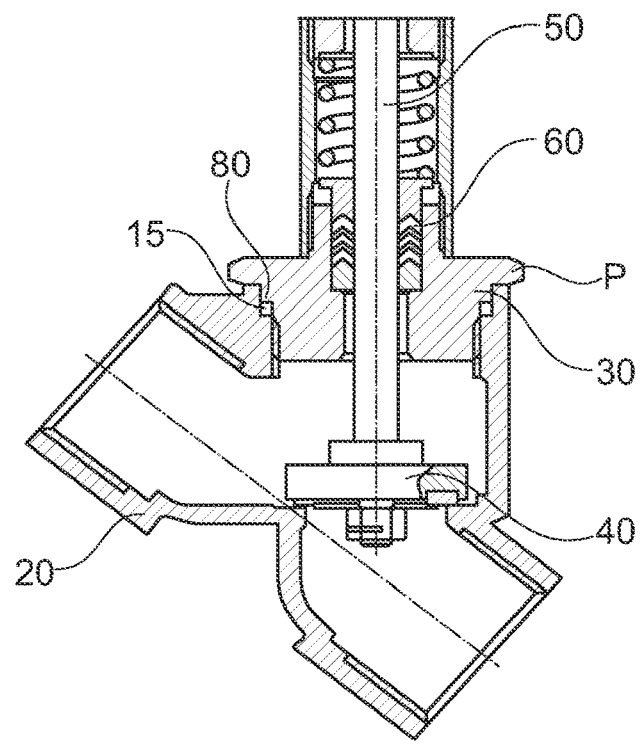
Figure 1B:
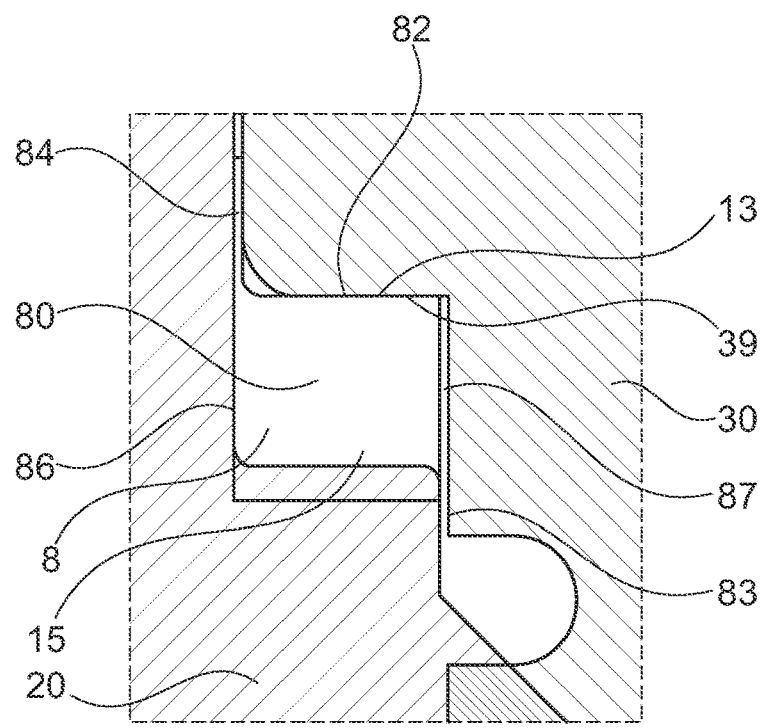
Figure 2:
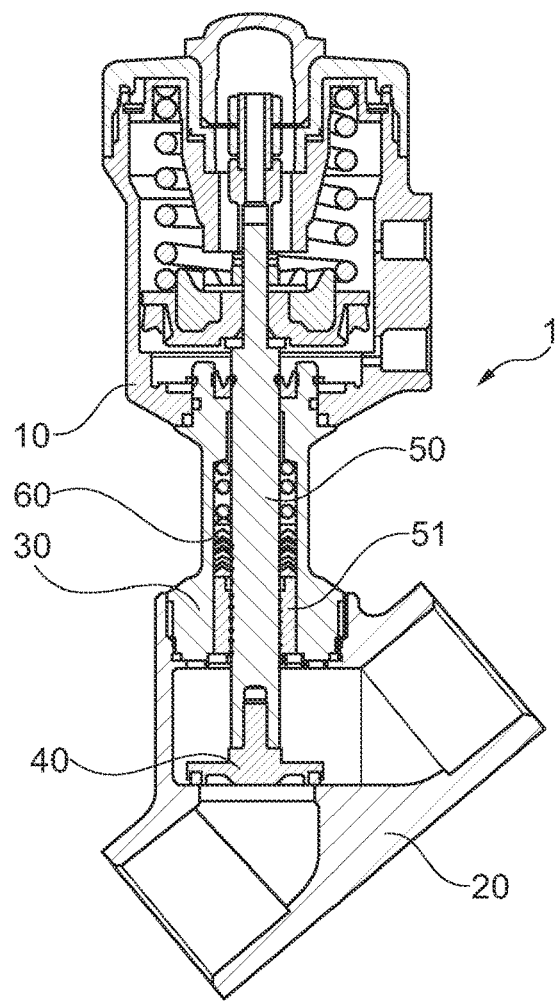
FIG. 2 is a schematic view of a valve system of the invention.

A valve system 1 of the invention, as shown in FIG. 2, comprises a valve body 20 and a top box 10. The valve body 20 houses a plunger 40 fixed to a reciprocating stem 50 at one end. The opposite end of the reciprocating stem 50 extends into the top box 10, which comprises an actuator for controlling the up and down movement of the stem 50 along the longitudinal axis X of the system, thus the opening and closing of the valve by the plunger 40.

Figure 3:
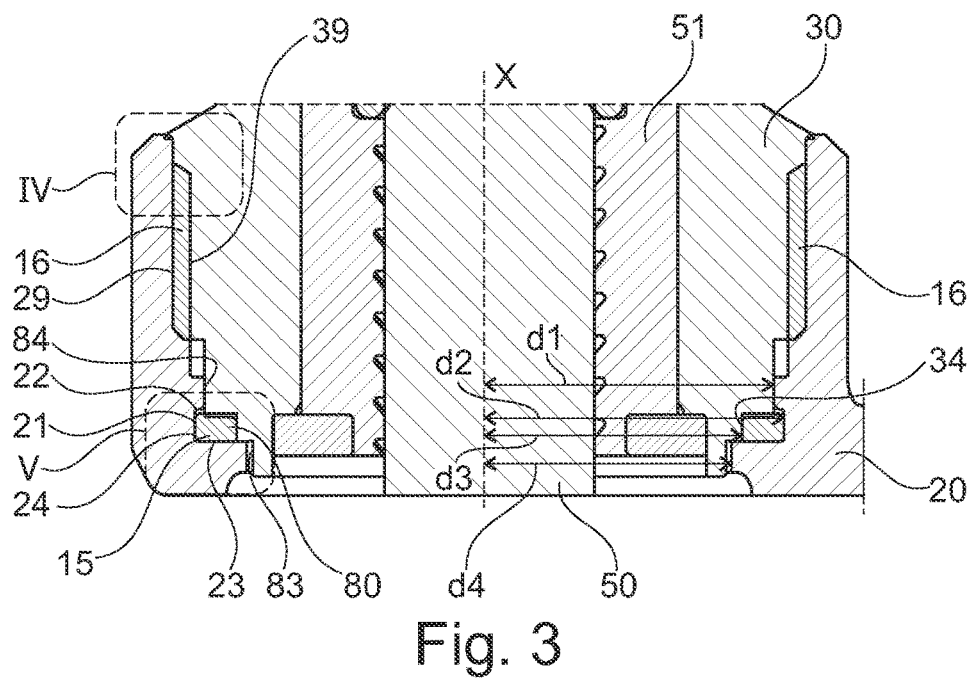
FIG. 3 is a partial view of a valve system of the invention.

As shown in FIG. 3, a stuffing box 30 is screwed to the valve body 20 via cooperating threads 16, situated respectively on an internal surface 29 of the valve body 20 and an external surface 39 of the stuffing box 30. The stuffing box 30 comprises a central bore 51 inside which the stem 50 may slide.

Figure 4:
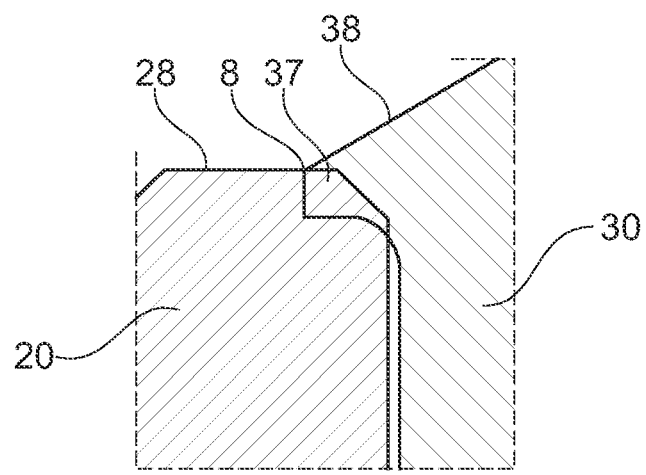
FIGS. 4 and 5 are enlarged views of circled areas IV and V of FIG. 3.

As can be seen in FIG. 4, a top surface 38 of the collar 37 forms a smooth joint line 8 with an adjacent top surface 28 of the valve body 20, without the presence of any substantial acute- or right-angle external protrusion between the top surfaces 28 and 38. In this way, there is no substantial retention area created at the joint line 8, which helps to avoid accumulation of undesired substances therein.

Figure 5:
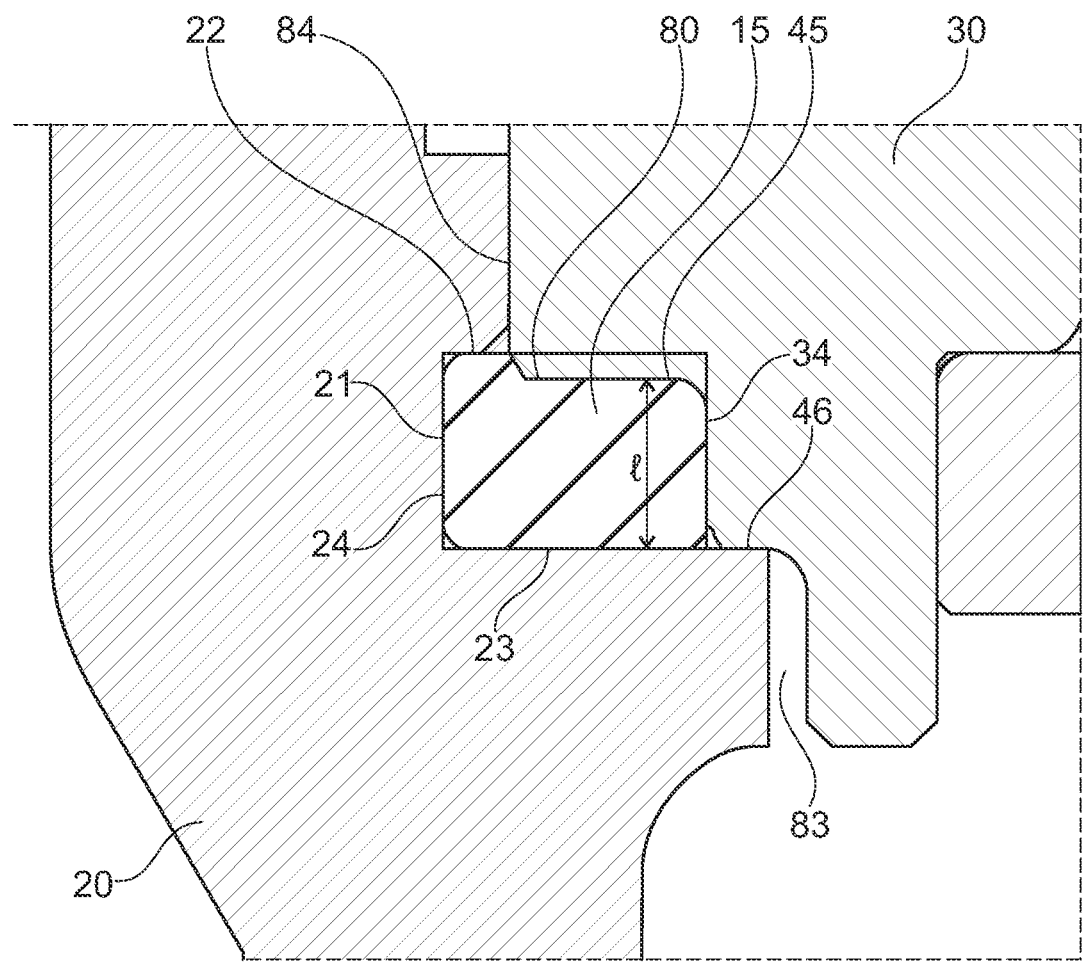
Figure 5A:
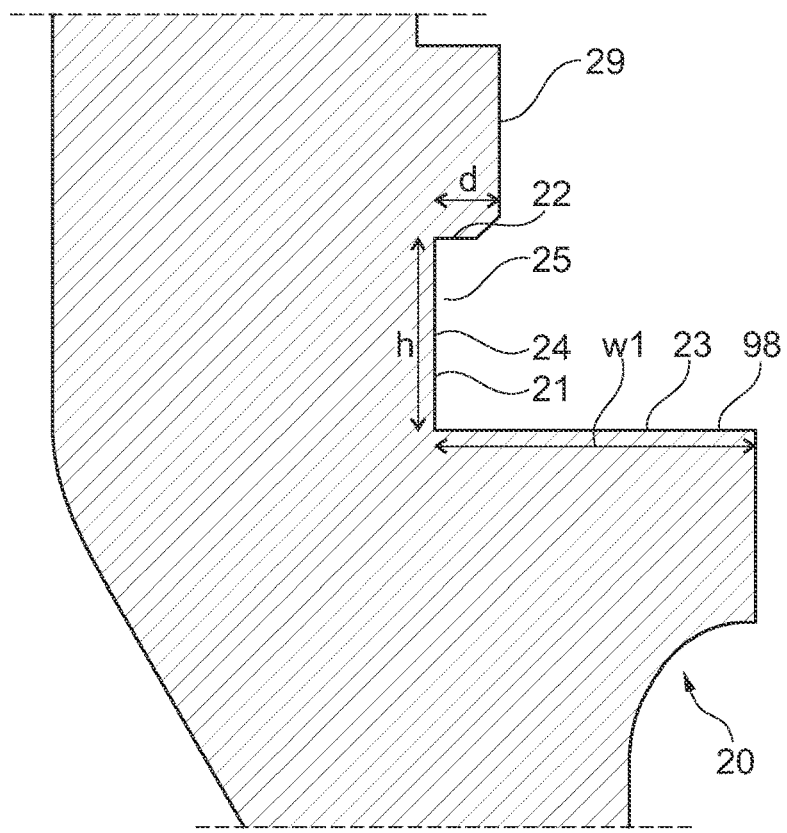
FIGS. 5A and 5B are isolated views respectively of the valve body and the stuffing box of FIG. 5.

As shown in FIGS. 5 and 5A, the valve body 20 comprises an annular groove 21 on its internal surface 29. The annular groove 21 comprises a bottom 24, an upper side 22 and a lower side 23. The bottom 24 of the annular groove 21 extends axially between the upper and lower sides 22, 23. The lower side 23 is defined by a shoulder 98 of the valve body.

The annular groove 21 preferably has a depth d, measured in a direction parallel to a radial direction of the valve system, which is at least of 1 mm.

The annular groove 21 has a height h, measured in a direction parallel to the longitudinal axis X of the valve system, that is preferably of between 2 and 5 mm.

The shoulder 98 has a width w 1 preferably of between 2 mm and 10 mm when measured radially.

Figure 5B:
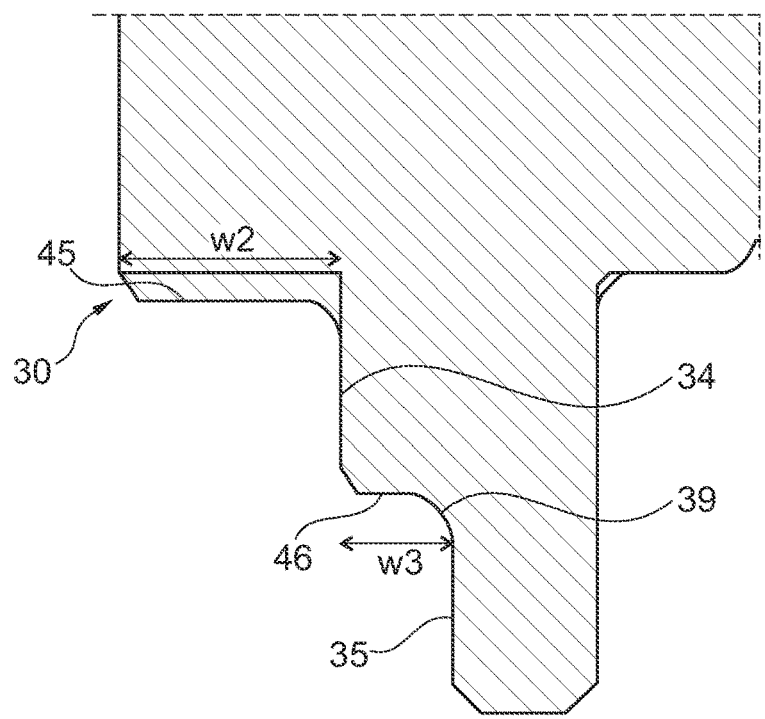

The stuffing box 30, as shown in FIGS. 5 and 5B, comprises on its external surface 39 a first shoulder 45 and a second shoulder 46. The first shoulder 45 is configured for coming in axial contact with the sealing element 15. The second shoulder 46 is in axial abutment with the shoulder 98 defining lower side 23 of the groove 21.

The first and second shoulders are separated by a cylindrical surface 34 extending axially.

The first shoulder 45 may have a width w 2 of between 2 mm and 10 mm.

The second shoulder 46 may have a width w 3 of between 2 mm and 10 mm.

In the illustrated embodiment, the annular cavity 80 is located closer to the plunger than the threads 16, when observed in the longitudinal direction X of the valve system.

The valve system comprises a first interface 84 between the stuffing box 30 and the valve body 20 that is situated farther to the plunger 40 than the annular cavity 80. As can be seen in FIG. 5, the first interface 84 is radially inner to the bottom 24 of the groove 21.

The valve system comprises a second interface 83 between the stuffing box 30 and the valve body 20 that is situated axially closer to the plunger 40 than the annular cavity 80. The second interface 83 is radially inner to the surface 34.

Figure 6:
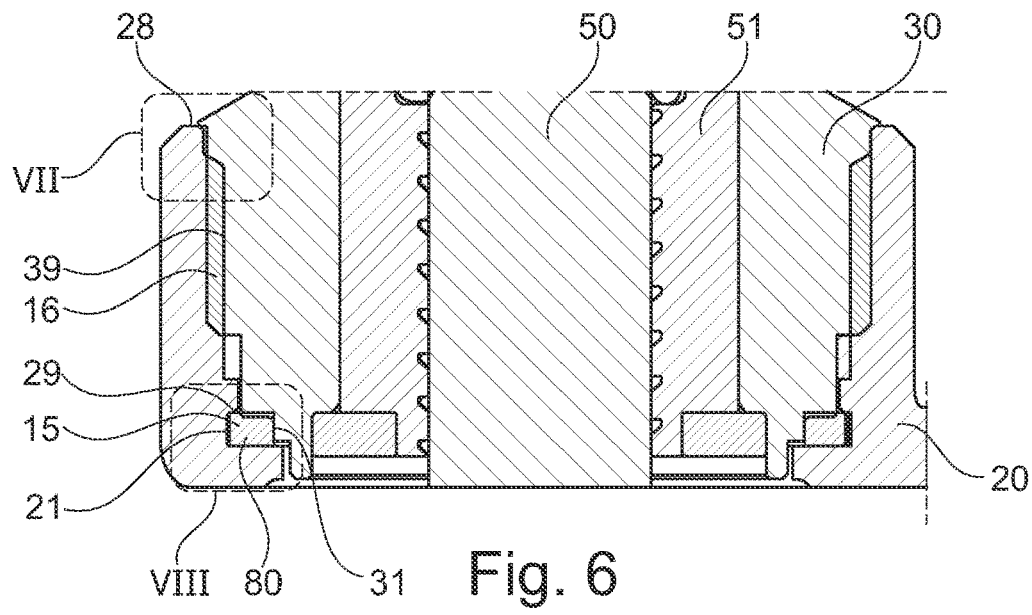
FIG. 6 is a partial view of the valve system of FIG. 3, at the beginning of the assembly.
Figure 7:
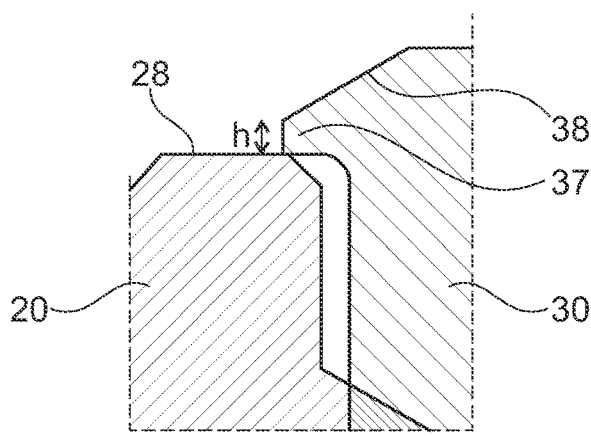
FIGS. 7 and 8 are enlarged views of circled areas VII and VIII of FIG. 6.
Figure 8:
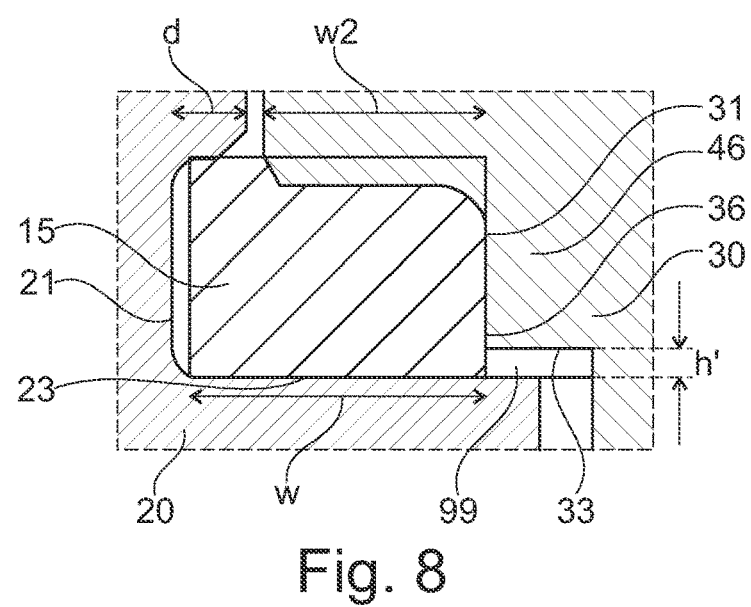

For assembly the valve system, the stuffing box 30 is screwed into the valve body until the collar 27 comes into abutment with the top surface 28 of valve body 20, as shown in FIG. 6 and FIG. 7. As shown in detail in FIG. 8, an axial gap 99 of a height h' is then existing between the lower side 23 of the groove 21 and the shoulder 46.

Then, by screwing further the stuffing box 30 into the valve body 20, the collar 37 is mechanically deformed, leading to the configuration shown in FIG. 4.

During this plastic deformation of the collar, the height h by which the collar 37 protrudes from the top surface 28 is decreased, substantially to a value of less than 1 mm. In this way, there is no pronounced discontinuity between the top surface 28 of the valve body 20 and the top surface 38 of the collar 37, which helps avoid accumulation of undesired material in the zone around the joint line 8.

At the end of the screwing, the shoulder 98 of the valve body comes into abutment with the second shoulder 46 of the stuffing box 20, so that the sealing element 15 is axially compressed by the first shoulder 45 and the shoulder 98 and expands radially.

Four sealing interfaces are thus formed, respectively between the sealing element 15 and the bottom 24, between the sealing element 15 and the lower side 23, between the sealing element 15 and the cylindrical surface 34, and between the sealing element 15 and the first shoulder 45.

The stuffing box 30 does not axially compress the sealing element 15 on its portion which is received in the annular groove 21.

As shown in FIG. 5, after assembly, the first shoulder 45 is axially closer to the lower side 23 than is the upper side 22 of the annular groove 21.

A ratio l/h between the distance l from the first shoulder 45 to the lower side 23 and the height h of the annular groove 21, is preferably between 0.5 and 0.9.

The ratio between the depth d of the groove 21 and the width $w_2$ of the first shoulder i.e. $d/w_2$ is preferably at least 2.

The invention is not limited to any particular top box, and various changes may be brought to the top box without departing from the scope of the invention.

The invention claimed is:

1. A valve system comprising: a valve body and a stuffing box assembled to the valve body, the valve body having an internal surface defining an annular groove, the annular groove comprising an upper side, a lower side and a bottom extending axially between the upper and lower sides, the annular groove forming with the stuffing box an annular cavity for receiving a sealing element, the sealing element being axially compressed between a shoulder of the stuffing box and a shoulder of the valve body defining lower side of the groove, the upper side of the annular groove not overlapping with the stuffing box in a radial direction within the annular cavity.

2. The valve system of claim 1, the groove having a depth of at least 1 mm.

3. The valve system of claim 1, a shoulder of the valve body defining the lower side of the groove coming in axial abutment with the stuffing box.

4. A valve system comprising a valve body and a stuffing box assembled to the valve body, the valve body having an internal surface defining an annular groove, the annular groove comprising an upper side, a lower side and a bottom extending axially between the upper and lower sides, the annular groove forming with the stuffing box an annular cavity for receiving a sealing element, the stuffing box comprising a first and a second shoulder, the first shoulder coming in axial contact with the sealing element, the second shoulder not overlapping with the upper side of the annular groove in a radial direction.

5. A valve system comprising a valve body and a stuffing box assembled to the valve body, the valve body having an internal surface defining an annular groove, the annular groove comprising an upper side, a lower side and a bottom extending axially between the upper and lower sides, the annular groove forming with the stuffing box an annular cavity for receiving a sealing element, the stuffing box comprising a first and a second shoulder, the first shoulder coming in axial contact with the sealing element, the second shoulder being in axial abutment with a shoulder of the valve body defining lower side of the groove.

6. The valve system of claim 4, the valve body comprising a cylindrical surface extending axially between the first and second shoulders and coming in radial contact with the sealing element.

7. The valve system of the claim 1, the valve body housing a plunger fixed at one end to a reciprocating valve stem.

8. The valve system of claim 7, the stuffing box being assembled to the valve body by screwing and the valve system comprising corresponding threads on the stuffing box and the valve body, the annular cavity being closer to the plunger than the threads, in a longitudinal direction of the valve system.

9. The valve system of claim 7, comprising a first interface extending axially between the valve body and the stuffing box, situated axially farther from the plunger than the annular cavity, being located at a distance from the longitudinal axis of the system, that is smaller than a distance from which the bottom of the groove is spaced from said axis.

10. The valve system of claim 7, comprising a second interface extending axially between the valve body and the stuffing box, situated axially closer to the plunger than the annular cavity, being located at a distance from the longitudinal axis of the system that is smaller than a distance by which the cylindrical surface extending axially between the first and second shoulders is spaced from said axis.

* * * * *